United States Patent
Killoran et al.

(10) Patent No.: US 10,149,028 B2
(45) Date of Patent: Dec. 4, 2018

(54) DIE INSERT FOR MOLDING A SPEAKER GRILLE

(71) Applicant: HI-TECH MOLD & ENGINEERING, INC., Rochester Hills, MI (US)

(72) Inventors: Steve Killoran, Roseville, MI (US); Anthony Debenedictis, Troy, MI (US); David Geschke, Rochester Hills, MI (US); Kevin Taverner, Shelby Township, MI (US)

(73) Assignee: Hi-Tech Mold & Engineering, Inc., Rochester Hills, MI (US)

( * ) Notice: Subject to any disclaimer, the term of this patent is extended or adjusted under 35 U.S.C. 154(b) by 99 days.

(21) Appl. No.: 15/488,928

(22) Filed: Apr. 17, 2017

(65) Prior Publication Data

US 2017/0303021 A1    Oct. 19, 2017

Related U.S. Application Data

(60) Provisional application No. 62/323,130, filed on Apr. 15, 2016.

(51) Int. Cl.

| | |
|---|---|
| B29C 45/34 | (2006.01) |
| H04R 1/02 | (2006.01) |
| B29C 45/73 | (2006.01) |
| B29C 45/26 | (2006.01) |
| H04R 31/00 | (2006.01) |
| B29L 31/30 | (2006.01) |
| B29L 31/34 | (2006.01) |

(52) U.S. Cl.
CPC ......... *H04R 1/023* (2013.01); *B29C 45/2626* (2013.01); *B29C 45/2628* (2013.01); *B29C 45/2673* (2013.01); *B29C 45/34* (2013.01); *B29C 45/7312* (2013.01); *H04R 31/00* (2013.01); *B29L 2031/30* (2013.01); *B29L 2031/3418* (2013.01); *H04R 2201/029* (2013.01)

(58) Field of Classification Search
CPC ............................. B29C 45/34; B29C 45/345
See application file for complete search history.

(56) References Cited

U.S. PATENT DOCUMENTS

| | | | | |
|---|---|---|---|---|
| 3,443,281 | A | * 5/1969 | Walby | ................... B29C 33/302 249/117 |
| 3,555,620 | A | 1/1971 | Bucy | |
| 3,811,647 | A | * 5/1974 | Pink | ........................ B29C 33/10 249/160 |
| 5,356,281 | A | 10/1994 | Katsuno et al. | |
| 5,419,865 | A | * 5/1995 | Ogata | ................. B29C 45/2628 249/64 |

(Continued)

*Primary Examiner* — Jill L Heitbrink
(74) *Attorney, Agent, or Firm* — Warner Norcross + Judd LLP

(57) ABSTRACT

An insert of a die for molding a speaker grille includes a forming member. The forming member defines a forming surface, from which a plurality of pins extend for forming apertures in a speaker grille. The forming surface defines a plurality of apertures disposed at spaced locations between the pins. The apertures are interconnected with a plurality vent channels communicating the apertures with the vent channels for venting air disposed in a die when melted polymer used to form the speaker grill is injected into the die. The forming member and the vent channels are formed as a monolithic construction.

10 Claims, 6 Drawing Sheets

(56) References Cited

U.S. PATENT DOCUMENTS

| | | | |
|---|---|---|---|
| 5,665,281 A | | 9/1997 | Drummond |
| 5,690,886 A | * | 11/1997 | Kurihara ............. B29C 45/0046 |
| | | | 264/328.1 |
| 6,164,953 A | | 12/2000 | Winget |
| 6,533,880 B1 | * | 3/2003 | van Manen .......... B26D 7/1818 |
| | | | 156/156 |
| 2002/0150274 A1 | | 10/2002 | Winget |
| 2005/0257998 A1 | | 11/2005 | Sato et al. |
| 2006/0134250 A1 | * | 6/2006 | Henrotte ................ B29C 33/10 |
| | | | 425/35 |
| 2007/0145637 A1 | | 6/2007 | Sato et al. |
| 2014/0014286 A1 | | 1/2014 | Suzuki et al. |
| 2016/0228942 A1 | | 8/2016 | Maegawa et al. |
| 2018/0250860 A1 | * | 9/2018 | Killoran ................. B29C 45/34 |

\* cited by examiner

DIE INSERT FOR MOLDING A SPEAKER GRILLE

PRIOR APPLICATIONS

The present application claims priority to U.S. Provisional Patent Application No. 62/323,130 filed on Apr. 15, 2016.

TECHNICAL FIELD

The present invention relates generally toward an insert of a die for molding a speaker grille. More specifically, the general invention relates toward an improved configuration and substrate of an insert of a die for molding speaker grille.

BACKGROUND

For many years, speaker grilles for use in automobiles have been integrated into, for example, door pads, package shelves, and other interior components of an automobile. Integrating speaker grilles into these components by way of a simple injection mold reduces complexity of assembling a door pad or package shelf. Various options, including differently configured speaker grilles, are available to meet the desires of an individual consumer. As such, a number of different inserts are adapted to mold a speaker grille simultaneously with that of a door pad substrate or other component. A die insert for forming a speaker grille typically includes a plurality of pins used to form a plurality of small acoustic openings in the speaker grille. The die insert is installed in a larger die used to form the substrate of a door pad or other component simultaneously with the speaker grille.

The level of complexity of the pin configuration used to form the acoustic openings in the speaker grille has prevented normal venting features from being included in a typical speaker grille insert as these features are with less complex dies and die inserts. In some instance, use of complex valves has been attempted, but has proven costly and prone to break. Therefore, inserts for speaker grilles have been manufactured from Porcerex® II, a porous substrate that allows air to pass through, but prevents multipolymer from passing through, while retaining the polymer used to form the speaker grille inside the die cavity. Porcerex® II is exceedingly expensive and difficult to form. In addition, venting characteristics the porous substrate have not proven effective to maintain desired cycle time for molding a speaker grille due to the slow diffusion of gasses through the substrate. Therefore, it would be desirable to develop a new insert for forming a speaker grille that overcomes the deficiencies known to the present porous insert.

SUMMARY

An insert for a die for building a speaker grille includes a forming member including a forming surface defining a plurality of pins. The pins form acoustic openings in the speaker grille necessary for allowing sound generated from a speaker to pass into a passenger compartment. The forming surface defines a plurality of apertures disposed at spaced locations between the pins for venting gas from a die cavity while forming the speaker grille. The apertures are interconnected with a plurality of vent channels extending through the forming member venting the gas disposed in the die cavity when melted polymer is injected into the die to form the speaker grille. The forming member and the vent channels are defined by a monolithic construction.

The monolithic construction of the present insert of a die for molding a speaker grille is achieved through three dimensional printing techniques so that the monolithic construction of the entire insert is achieved. The monolithic construction overcomes the deficiencies known to other venting techniques used to form speaker grilles that are complex and prone to break. In addition, the gas venting rates established by this technique exceeds the venting rate of a porous substrate, which reduces cycle time necessary to adequately form a speaker grille.

In addition, quality improvements are achieved by the invention of the present application. For example, additional venting can now be provided to localized areas of the die insert where gas is believed to prevent liquid polymer flow at no additional cost. Localized increase of gas venting is not possible when using a homogeneous porous substrate to form the die substrate. The invention of the present application solves both known quality problems by providing localized gas venting, and reduces cost of manufacturing speaker grilles by providing a simplified low cost die insert.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION

Figure 1:
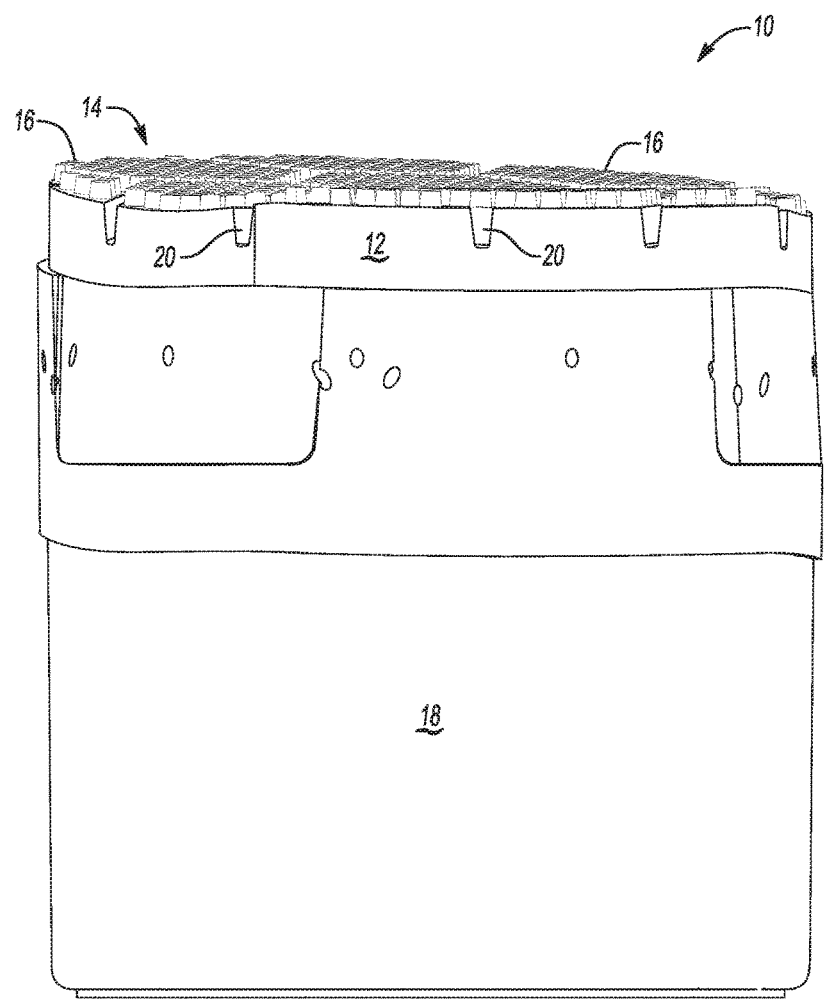
FIG. 1 shows a side view of a die insert for forming a speaker grille.

Referring to FIG. 1, a die insert of the present invention for forming a speaker grille (not shown) is generally shown at 10. The die insert 10 includes a forming member 12 that defines a forming surface 14. The forming surface 14 defines a plurality of pins 16 used to form acoustic openings in the speaker grille. The die insert 10 fits within a complementary opening defined by a first die member 15 (FIG. 7) used to form door pads, package shelfs, and other components of a vehicle in which it is desirable to form a speaker grille. It should be understood by those of ordinary skill in the art that a speaker grille is injection molded simultaneously with injection molding a vehicle component to provide efficiency and eliminate the need to form a separate speaker grille that is later mounted upon the vehicle component. An integrated speaker grille significantly reduces labor and cost associated with attaching a separate speaker grille to a vehicle component.

In one embodiment, the die insert 10 is defined by a monolithic construction, without moving parts. The die insert 10 is encased is defined as solid structure including an insert wall 18. The material used to form the structure is substantially impermeable to gasses and polymers used to simultaneously form the speaker grill and vehicle component.

Figure 2:
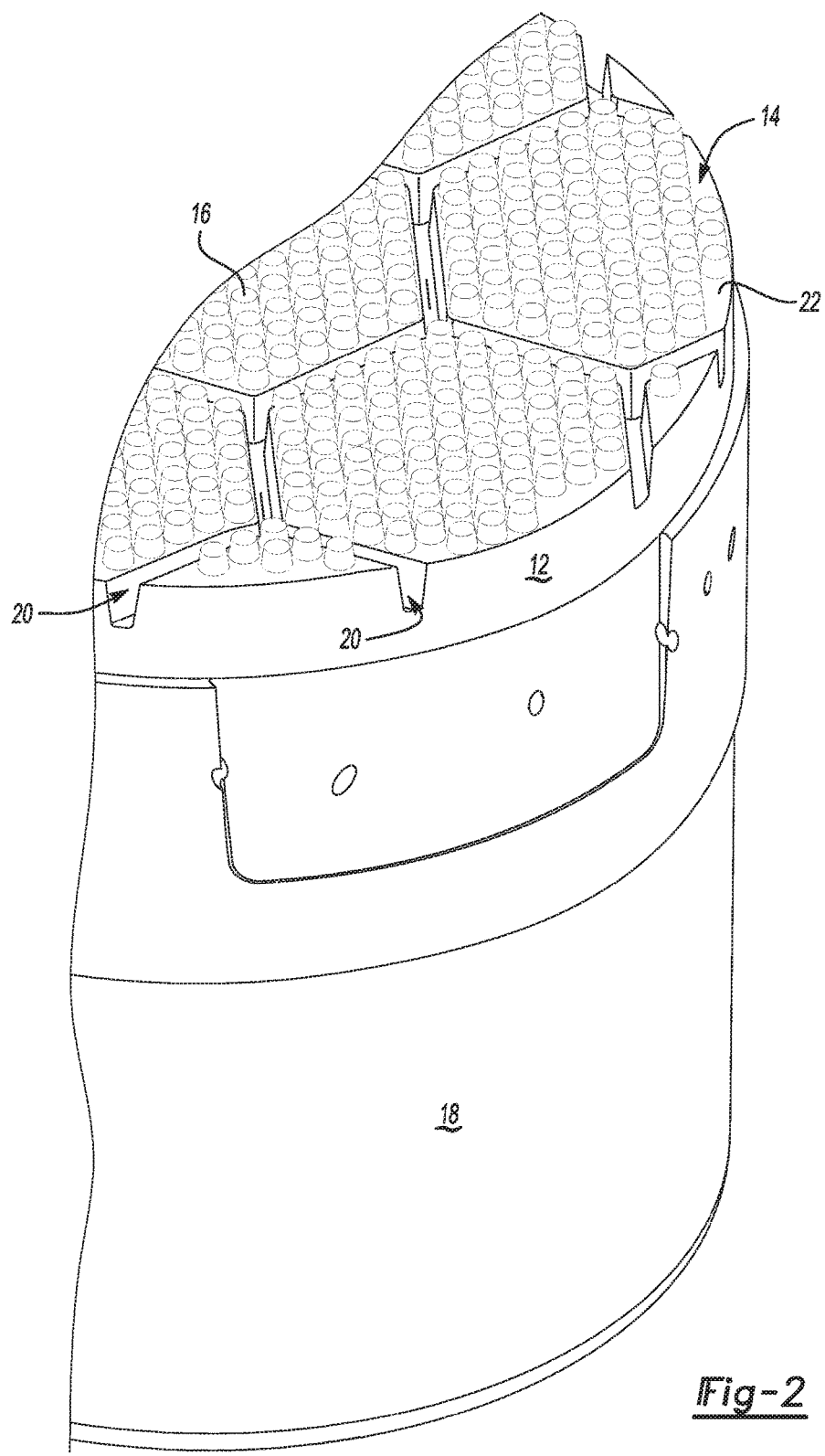
FIG. 2 shows a partial perspective view of the die insert.

Referring now to FIG. 2, the pins 16 are spaced in a predetermined pattern such that an aesthetically pleasing grille is formed integrally with the vehicle pad as will be explained further below with respect to FIG. 7. The pins 16 are formed from a three dimensional printing process achieving a configuration that is near to dimensional intent. If necessary, electrical discharge machining or an equivalent machining process is performed on the pins 16 to achieve net dimensional intent.

Channels 20 are defined in the forming surface 14 to provide structural support to the molded speaker grille, and further provide an aesthetically pleasing appearance for the speaker grille. The pins 16 extend between the channels 20 from a generally planer pin base 22 also defined by the forming surface 14. In an alternative embodiment, the pin base 22 includes contours to meet functional design criteria or provide a different appearance.

Figure 3:
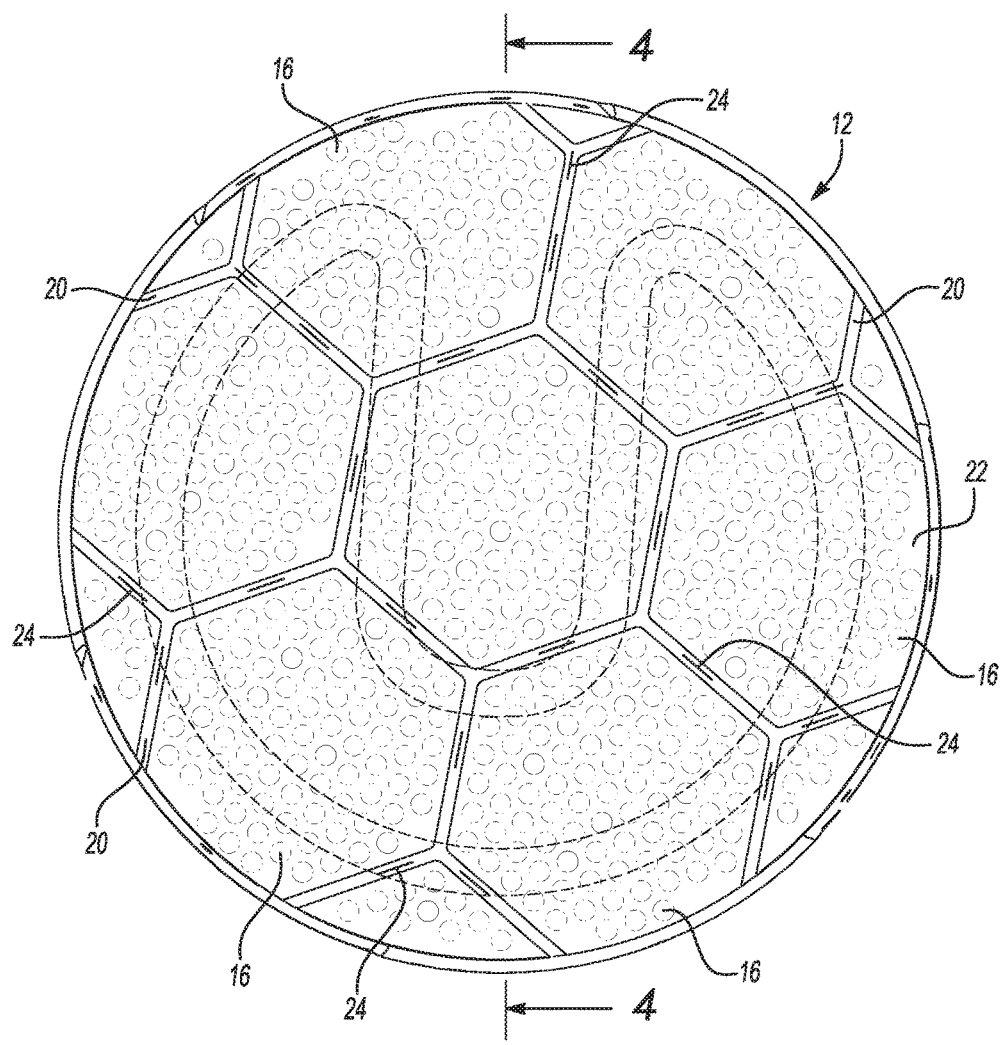
FIG. 3 shows a plan view of the forming surface of the die insert.
Figure 4:
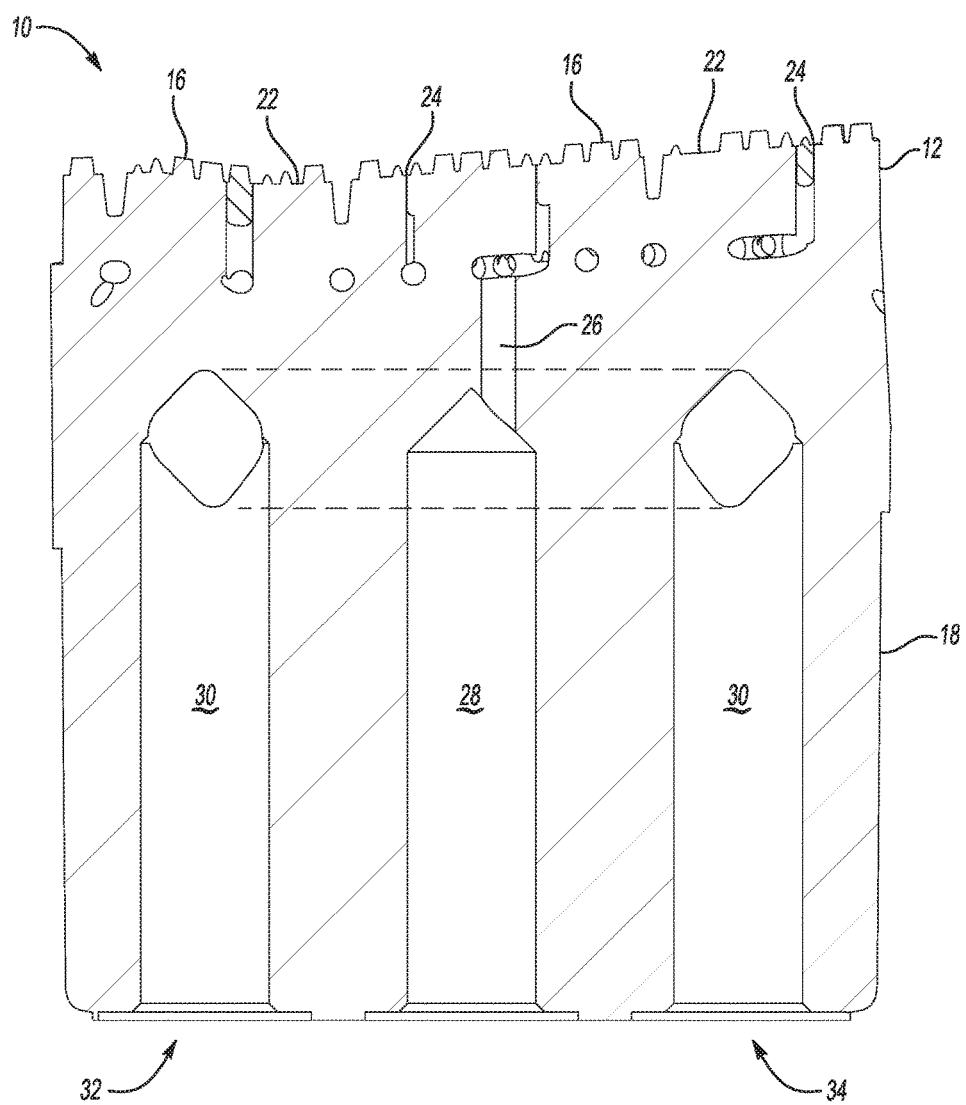
FIG. 4 shows a cross-sectional view of the die insert through line 4-4 of FIG. 3.
Figure 5:
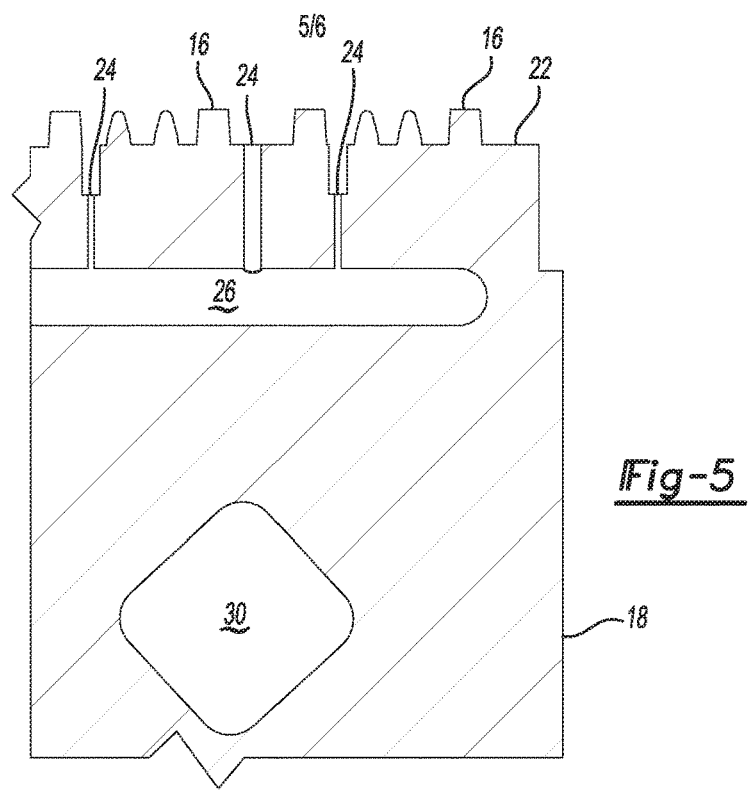
FIG. 5 shows a further sectional view of the die insert.
Figure 6:
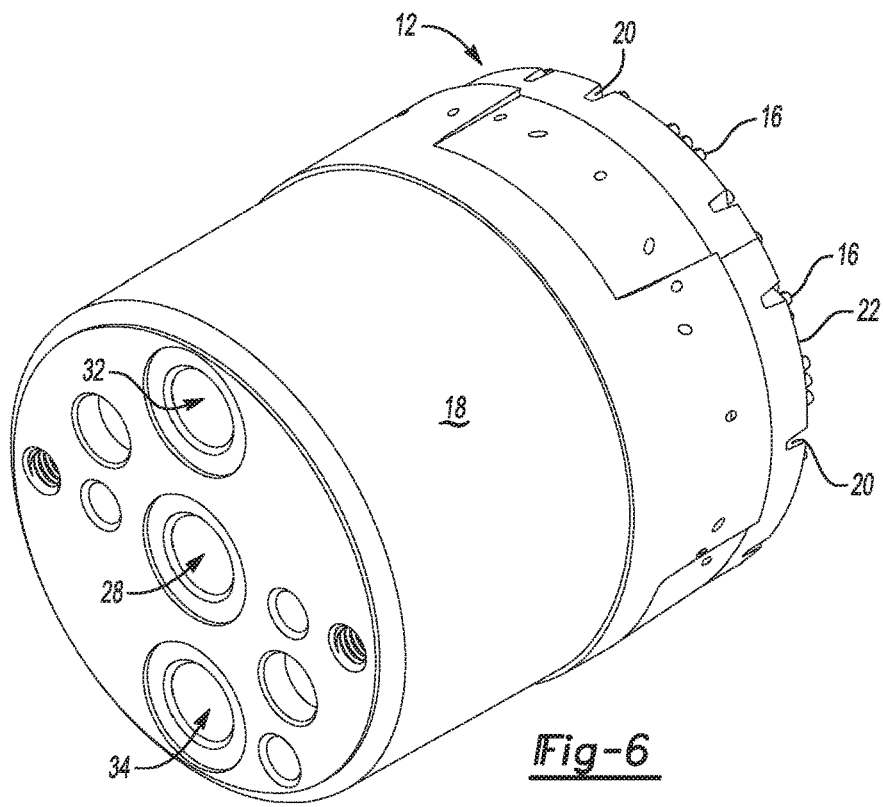
FIG. 6 shows a bottom, prospective view of the die insert.

Referring to FIG. 4, a cross-sectional view of the die insert 10 of the present invention is shown along line 4-4 of FIG. 3. A plurality of pin apertures 24 are defined by the pin base 22 between predetermined pins 16. In addition, the channel apertures 25 are also located at a floor of the channels 20 providing further venting enabling the polymer to properly fill the channels 20. The apertures 24, 25 are sized to allow air or other gases to exit a die cavity 27 (FIG. 7) during the component molding process while retaining liquefied polymer as will be explained further herein below. As such, efficient flow of the polymer between the pins 16 and through the channels 20 is achieved.

The apertures 24, 25 are interconnected to one or more a vent channels 26. Each vent channel 26 leads to a central vent 28 that vents gases received through the apertures 24, 25 to the atmosphere. As set forth above, the pins 16 are formed by way of three dimensional printing techniques. It should be understood that the entire insert 10 may be formed from by the three dimensional printing techniques. Forming the insert in this manner allows for the apertures 24, 25 the vent channel 26, and the vent 28 and all of the other elements of the insert 10 to be formed within a solid structure. Therefore, the entire insert 10 includes a monolithic construction without requiring additional machining for venting and without requiring multiple components being assembled to achieve necessary venting.

A cooling channel 30 is also formed in the insert 10 and includes a cooling inlet 32 and a cooling outlet 34. The cooling channel 30 provides for the flow of a cooling medium throughout the die insert 10 to increase the rate at which the liquefied polymer solidifies. The cooling channel 30 circumscribes the vent 28 at a location proximate the forming member 12. In a similar manner as the vent channel 26, the cooling channel 30 was formed within the die insert 10 without requiring machining or additional components. Further, coolant supply lines (not shown) are optionally affixed to the insert 10 at the coolant inlet 32 and the coolant outlet 34 through a printed and machined connector 33 without requiring additional coupling arrangements. Cooling the die insert 10 formed with a monolithic construction is not possible when the insert 10 is formed from a porous substrate. However, forming the die insert 10 of the present invention with a non-porous substrate with strategically placed venting provides the ability to cool the insert 10 without requiring complicated, and expensive external cooling features.

Figure 7:
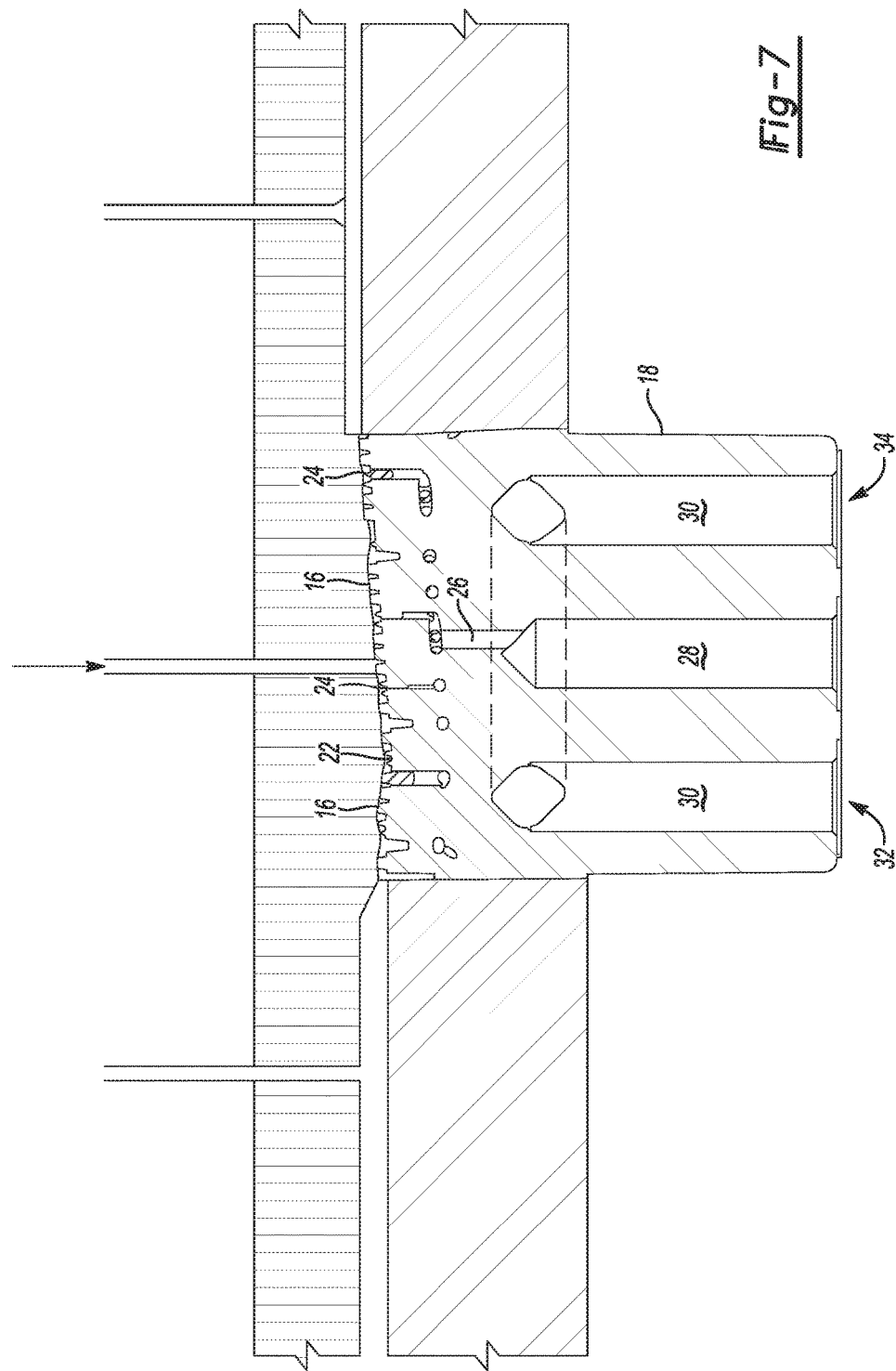
FIG. 7 shows a partial cross-sectional view of the die insert installed in an injection mold assembly.

Referring now to FIG. 7, the insert 10 is shown installed in an injection mold assembly generally shown at 36. The assembly 10 defines the die cavity 27 between the first die member 15 and a second die member 17. For clarity, only a cut away of the injection mold assembly 36 is shown. However, it should be understood that the assembly 36 is used to form an entire vehicle component simultaneously with the speaker grille as is set forth above.

The assembly includes a plurality of runners 38 that are each interconnected with an extruder (not shown) for delivering liquefied polymer such as, for example, polypropylene, filled polypropylene or and equivalent to the die cavity 27. The runners are spaced along one or both of the first die member 15 and the second die member 17 for efficient polymer flow into the die cavity 27. In addition, the apertures 24, 25 are space at locations in the insert 10 that most efficiently facilitates polymer flow through the die cavity 27 into the area of the forming surface 14. In addition, clusters, or higher density of apertures 24, 25 may be located in the forming surface 14 to provide additional venting where necessary to prevent empty spaces forming in the speaker grille resulting from gas pockets in the die cavity 27.

The invention has been described herein in an illustrative manner, and it is to be understood that the terminology which has been used is intended to be in the nature of words of description rather than of limitation. Obviously, many modifications and variations of the invention are possible in light of the above teachings. The invention can be practiced otherwise than as specifically described within the scope of the appendant claims.

What is claimed is:

1. An insert of a die for molding a speaker grille, said insert comprising:
    a forming member including a forming surface defining plurality of pins extending therefrom for forming acoustic openings in a speaker grille, said forming surface defining a plurality of apertures disposed at spaced locations between said pins;
    said apertures being interconnected by a plurality vent channels extending through said forming member for venting gas disposed in a die cavity when melted polymer used to form the speaker grill is injected into the die cavity; and
    said forming member and said vent channels being defined by a monolithic construction.

2. The insert set forth in claim 1, wherein said plurality of vent channels is interconnected with a vent manifold.

3. The insert set forth in claim 1, wherein said vent manifold is defined by said forming member.

4. The insert set forth in claim 2, wherein said vent manifold is interconnect to a central exhaust.

5. The insert set forth in claim 4, wherein said central exhaust is defined by said forming member.

6. The insert set forth in claim 4, wherein said central exhaust vents air evacuated from the die to atmosphere.

7. The insert set forth in claim 1, further including a cooling channel for circulating cooling medium proximate said forming member.

8. The insert set forth in claim 7, wherein said cooling channel is defined by a monolithic construction with said forming member and said vent channels.

9. The insert set forth in claim 1, wherein said forming member is formed from a homogeneous alloy.

10. The insert set forth in claim 1, wherein said homogeneous alloy is substantially impermeable.

* * * * *